June 2, 1942.  J. H. KROEGER  2,284,826
SOD CUTTING MACHINE
Filed May 4, 1939   3 Sheets-Sheet 1

INVENTOR.
Joseph H. Kroeger.
BY Murray Sackhoff & Paddack,
ATTORNEYS.

June 2, 1942.    J. H. KROEGER    2,284,826
SOD CUTTING MACHINE
Filed May 4, 1939    3 Sheets-Sheet 2
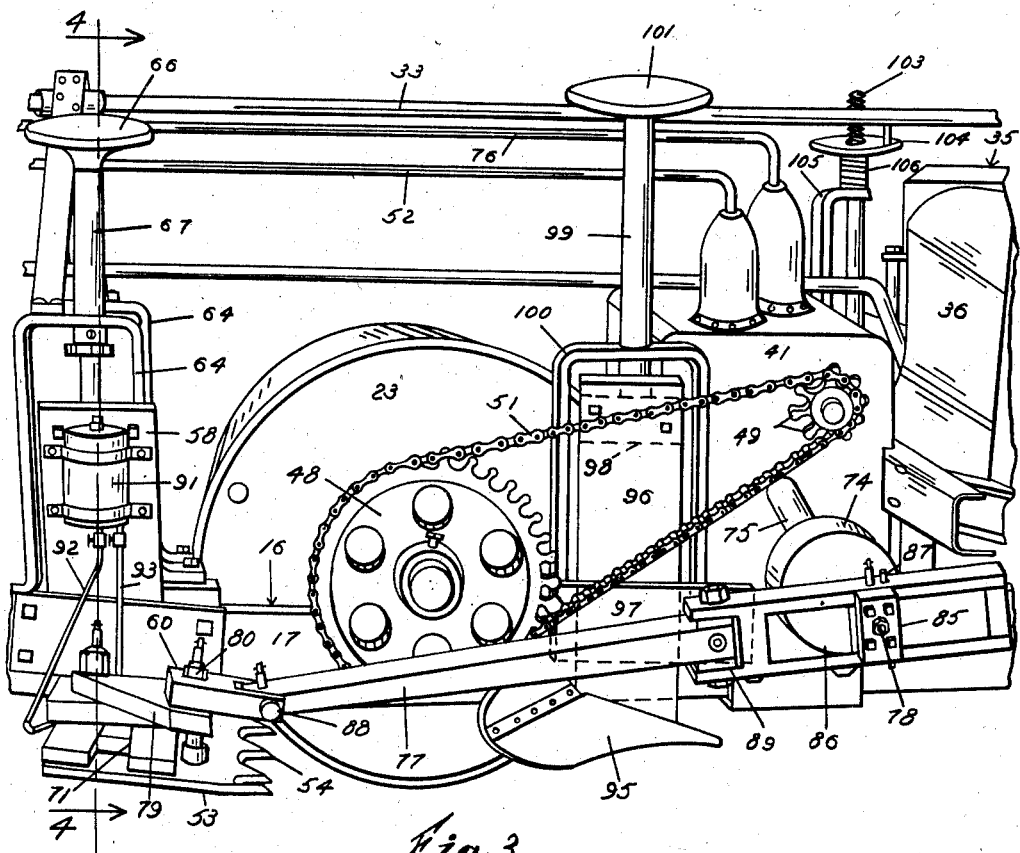
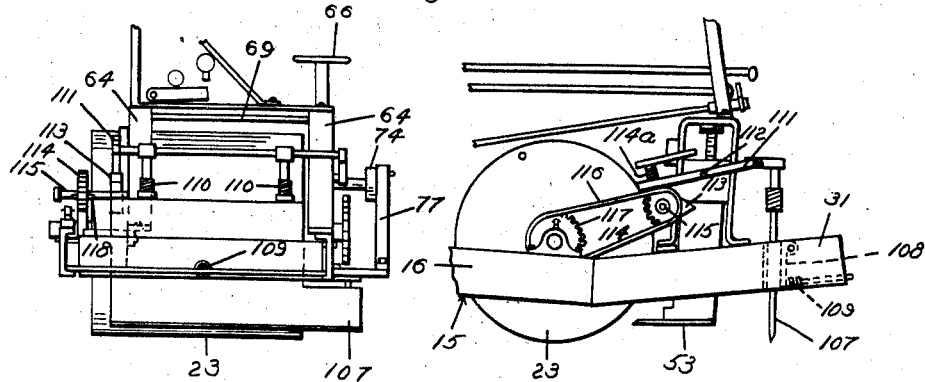
INVENTOR.
Joseph H. Kroeger.
BY Murray Sachhoff & Paddack.
ATTORNEYS.

June 2, 1942.  J. H. KROEGER  2,284,826
SOD CUTTING MACHINE
Filed May 4, 1939  3 Sheets-Sheet 3
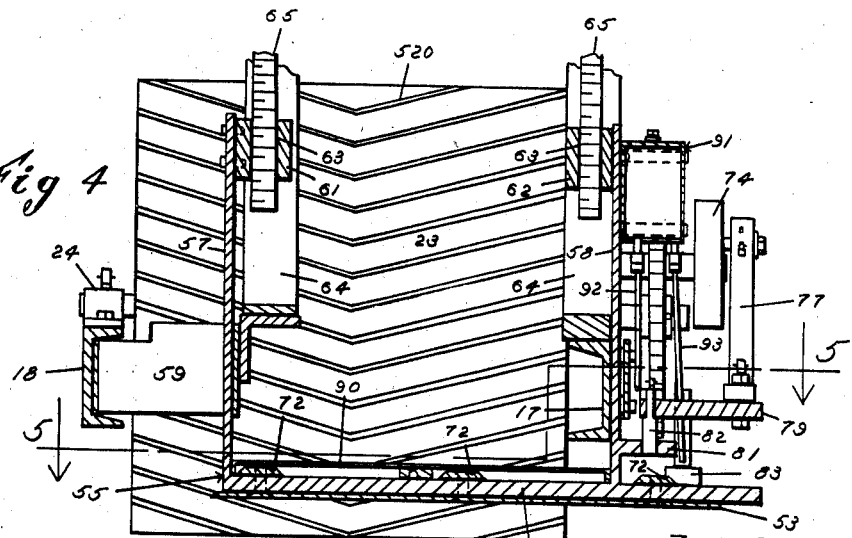
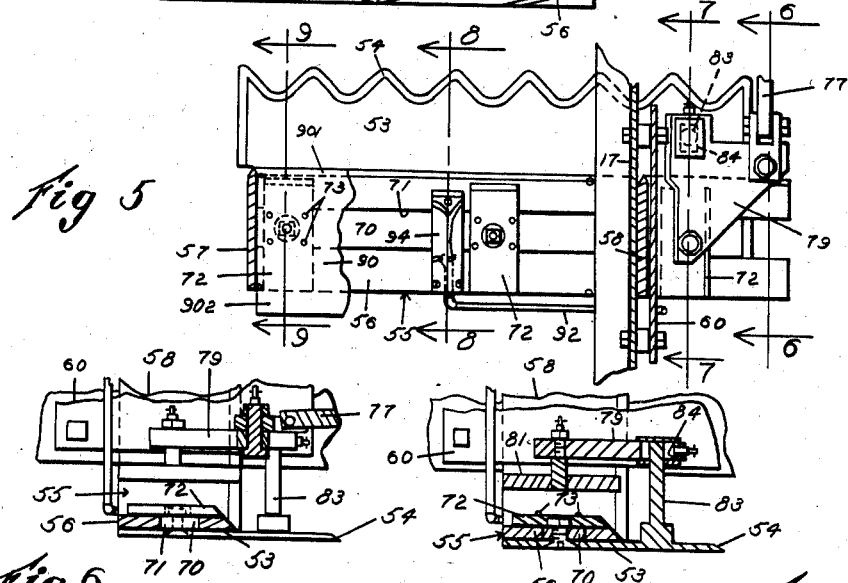
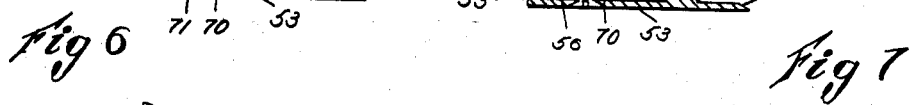
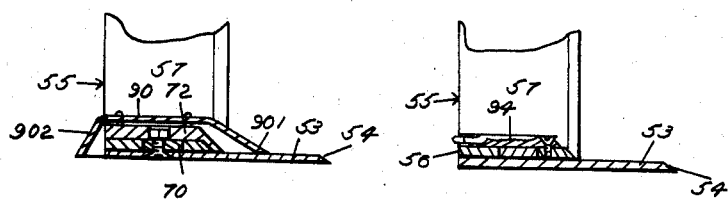
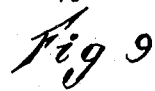
INVENTOR.
Joseph H. Kroeger.
BY Murray Sackhoff + Paddach.
ATTORNEYS.

Patented June 2, 1942

2,284,826

UNITED STATES PATENT OFFICE 2,284,826

SOD CUTTING MACHINE

Joseph H. Kroeger, Cheviot, Ohio

Application May 4, 1939, Serial No. 271,817

22 Claims. (Cl. 97—226)

The present invention relates to machines for cutting sod.

It is an object of the invention to provide a means for cutting sod in strips which is reciprocated in a direction transversely of the longitudinal dimension of the strips to be cut.

Another object of the invention is to provide a machine which will compact and firmly press down a particular piece of sod along the entire portion being cut by a reciprocating knife mounted on the machine.

It is also an object of this invention to utilize the weight of a motor and other accessories mounted on a sod cutting machine to provide a machine which will compact, roll and firmly hold down a particular piece of sod so that a reciprocating knife can sever it in smooth sections, said weight being further used to provide traction means for the machine for operation on all types of ground and also to preclude transverse movement of the machine due to the transmission of this tendency to it from the reciprocating knife working in the soil.

Another object of the invention is to provide a machine which will produce comparatively thin sod which will not tear, is of uniform thickness and is, therefore, economically transported and laid. When sod so produced is laid, the grass roots therein quickly knit to the ground upon which the sod is positioned thus quickly forming a firm bond between the sod and the ground. Because of its relatively light weight, sod produced by my device has also less chance, during rainy weather, of sliding from its original position when placed on uneven ground.

Another object of the invention is to provide a means of cutting a narrow, elongated strip of sod of any desired length in an efficient manner and in a comparatively short period of time.

A further object of the invention is to provide a means of cutting sod which produces sod having well defined, longitudinal edges to prevent said edges from tearing during handling and transportation and permit said sod to be laid edge to edge in the conventional manner to present a neat sodded area without holes or patches.

A still further object of the invention is to provide a means for producing a sod which is compact and of a uniform thickness so that it can be easily handled, transported and laid in the conventional manner without tearing or becoming frayed along its marginal edge portions.

Another object of the invention is to provide a means for producing sod having a smooth, clean surface along the portions which have contacted the cutting instrumentalities.

Another object of the invention is to provide means whereby the reciprocating cutting knife of the device is positively held in the same transverse plane of the roller supporting the device.

A further object of the invention is to provide a novel means for actuating the cutting knife of the device which is positive in operation and also to provide a knife having novel and improved features to adapt it for its particular use.

Generally, my device comprises a frame supported by a front and a rear roller and is propelled by means of a power unit positioned on the frame and connected by suitable mechanism to the rear roller. The front roller is rotatably mounted to the frame and is controlled by means of a conventional steering mechanism from an operator's station positioned at the rear of the device. A knife is mounted on the frame rearwardly of and subjacent the rear roller and is positioned transversely of the direction of movement of the device, suitable mechanism being provided for connecting the power unit to the knife for actuating the knife in a transverse reciprocating motion.

Other objects and functions will be apparent from the following specification and drawings, in which:

Fig. 3 is a side elevational view, in perspective, showing a detail of the rear mechanism of the device.

Fig. 4 is a fragmental cross-sectional view taken on line 4—4 of Fig. 3.

Fig. 5 is a cross-sectional view taken on line 5—5 of Fig. 4.

Fig. 6 is a cross-sectional view taken on line 6—6 of Fig. 5.

Fig. 7 is a cross-sectional view taken on line 7—7 of Fig. 5.

Fig. 8 is a cross-sectional view taken on line 8—8 of Fig. 5.

Fig. 9 is a cross-sectional view taken on line 9—9 of Fig. 5.

Fig. 10 is a fragmental side elevational view showing a means for providing spaced transverse cuts in the strip of sod produced by the device.

Fig. 11 is a rear elevational view of the device shown in Fig. 10.

Figure 1:
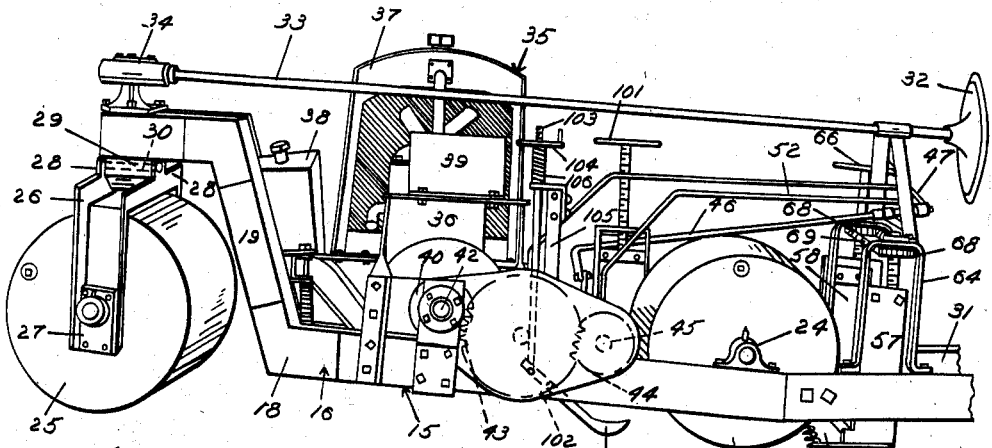
Fig. 1 is a side elevational view, in perspective, showing my sod cutting machine.

The embodiment of my invention comprises a sod cutter 15 having a frame 16. The frame consists of two spaced beams 17 and 18 which are formed to converge upwardly at their forward portion 19, the leading ends of said beams being bolted to a cross-block 20, the beams of the frame being held in spaced relationship by means of suitable cross-members such as indicated at 21 and 22. The rear of the frame is supported by means of a rear roller 23 which is journalled in bearings 24 fastened upon the frame members. A front roller 25 supports the front of the frame by means of a forked member 26 provided at its lower ends with bearing blocks 27 for receiving the axle of roller 25. The upper central portion of the forked member is provided with two spaced upstanding flanges 28 which are adapted to receive between them a block 29 rotatably mounted in cross-member 20. A pin 30 pivotally fastens the forked member to the rotatable block 29 so that the roller is permitted rotation in a plane at right angles to the direction of movement of the frame. The suspension of the forward part of the frame in the manner just described prevents any transverse inclination of the front roller from being imparted to the frame thus permitting the frame to freely respond to the transverse inclination of the rear roller, as will be more fully set forth hereafter. For providing directional movement to the frame, the rotation of the block 29 is controlled from the operator's station 31 at the rear of the device by means of a steering wheel 32 through the medium of shaft 33 and conventional worm and pinion connections 34.

A conventional power unit 35 is mounted on the frame and may consist of an internal combustion engine 36, a radiator 37, a fuel tank 38, battery 39 and clutch 40. A transmission 41 is connected to the driven shaft 42 of the motor by means of reduction gear train generally indicated as 43, gear 44 of said train being connected to said transmission by means of shaft 45. The clutch 40 for disengaging the motor from the transmission is controlled from the operator's station 31 by means of a rod 46 which has an arm 47 fastened to its rear extremity. The sod cutter is propelled by means of a sprocket gear 48 mounted co-axially with the rear roller which is driven by means of gear 49 connected to the transmission by drive rod 50. An endless chain 51 engages the teeth of gears 48 and 49 for transmitting power from the driving gear 49 to driven gear 48. A gear lever rod 52 operated from the operator's station 31 is provided for selectively driving the rear roller at desired relative speeds. To obtain sufficient traction for the rear roller, it is desirable to provide its peripheral surface with a number of shallow, diverging grooves 52a, as indicated in Fig. 4. Other tractional means may be employed provided said means does not injure the sod by cutting or pressing too deeply into its top surface.

Figure 12:
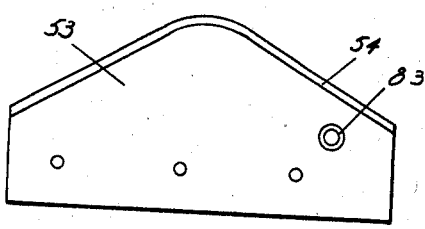
Fig. 12 is a top plan view of a modified form of knife which may be used with my device.

The means for providing the horizontal cut in the sod for severing it from the earth comprises a reciprocating knife 53 positioned rearwardly of the rear roller and transversely of the direction of movement of the sod cutter. The knife has a sinuously curved forward edge 54 (Figs. 3 and 5), said edge being also beveled upwardly as clearly shown in Figs. 6 and 7. It has been found that a blade made in the foregoing manner efficiently severs the sod from the earth, the beveled edge serving to dislodge any obstruction in the way of the knife and force it up through the surface of the sod, thus preventing injury to the blade or temporary shutdown of the machine. As shown in Fig. 12, the knife may also have a leading edge formed in the shape of a V. This form of knife has been found to give excellent results in loose soil, whilst the form shown in Fig. 5 is best adapted for use in sandy or hard packed soil. Variations in the number of teeth formed in the knife shown in these drawings may be made to adapt the knife for use in soil varying from loose to a hard packed consistency. The forward edge of the knife is disposed adjacent the rear roller so that the inclination of the knife and the roller is approximately the same to permit said knife to continuously cut a strip of sod which is of a uniform thickness regardless of the inclination of the area to be cut by my device. As has been explained, the front roller is pivoted in such manner as to permit the frame to assume the inclination given the rear roller by the various inclinations of the earth, and as the knife is mounted on the frame, the knife will therefore assume the inclination of the rear roller.

Figure 2:
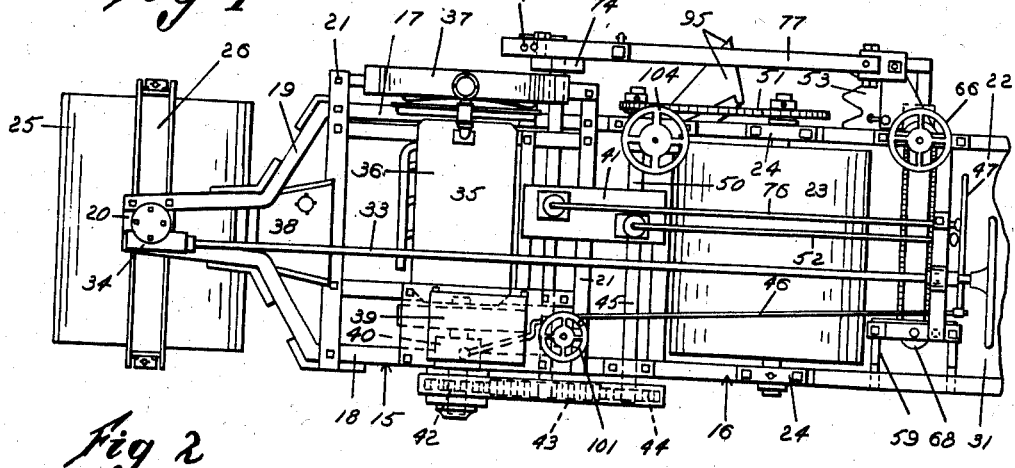
Fig. 2 is a top plan view of the device shown in Fig. 1.

The knife is mounted on the frame by means of a U-shaped carriage 55 which has a horizontal section 56 and upstanding side members 57 and 58 (Figs. 4 and 5). The interior surfaces of the upstanding portions of the carriage engage the exterior surfaces of the frame member 17 and an extension 59 is formed on the frame member 18 to prevent any transverse movement of the carriage relative to the frame. As shown in Fig. 2, the extension 59 is U-shaped and encircles the upstanding portion 57 of the carriage whilst a toggle plate 60 (Fig. 5), bolted to frame member 17, is adapted to movably hold upstanding portion 58, thus aiding to prevent longitudinal movement of the carriage relative to the frame. The upper ends of the upstanding portions are provided with blocks 61 and 62, respectively, which have formed therein centrally disposed, interiorly threaded apertures 63. The blocks are adapted to move in vertical guides mounted on the frame which consist of inverted U-shaped members 64 (Figs. 3 and 4). The knife carriage is made vertically adjustable by means of threaded shafts 65 rotatably fastened to the upper portions of the inverted U-shaped members 64 and threaded to the blocks 61 and 62. Rotation of the shafts is obtained by hand wheel 66 mounted on an extension 67 of one of the shafts, whilst the rotation of the shafts is synchronized by means of gear wheels 68 mounted on both shafts and adapted to receive endless chain 69 (Fig. 1).

The knife is mounted on the carriage for transverse reciprocation and is provided with a guide member 70 movably positioned in an elongated groove 71 formed in the horizontal portion of the carriage. As shown in Fig. 5, a number of lock plates 72 are positioned above the horizontal portions of the carriage and are fastened to the guide members by bolts 73.

The means for providing reciprocating motion to the knife relative to the carriage comprise a driven crank wheel 74 which is mounted on the end of a shaft 75 connected to the transmission 41. The relative speed of said crank wheel may be controlled from the operator's station by means of gear lever 76 (Figs. 2 and 3). A jointed pitman 77 is connected to an eccentric wrist pin 78 mounted on the crank wheel, whilst its rearward portion is pivoted to an oscillating wrist plate 79 by means of a pin 80. The wrist plate is rotatably mounted to an extension 81 formed on the knife carriage by means of a pin 82. An extension 83 on the knife 53 is adapted to movably receive an elongated slot 84 formed in the wrist plate (Figs. 5 and 7). The connection between the pitman and the crank wheel comprises a block 85 movably engaging a slot 86 formed in the pitman, said block being held from movement therein by means of a shear pin 87 (Fig. 3). The pitman is jointed at 88 and 89 to permit both horizontal and vertical relative movement between the forward and rearward portion of said pitman. As indicated in Figs. 4, 5, and 9, a cover 90 is positioned above and surrounds the horizontal portion of the carriage and the lock plate arrangement above it. As most clearly shown in Fig. 9, the forward edge 901 of the cover plate contacts the upper surface of the knife, whilst the rear edge 902 thereof extends beyond the rear of the knife and is in the plane of the lower surface of the knife 53.

I have found that my device operates efficiently in ordinary earth or earth containing various proportions of clay without affecting the reciprocating motion of the knife relative to the carriage. However, in sandy soil the reciprocation of the blade is affected so that it is desirable to flow oil upon the bearing surfaces of the carriage and knife. To this end, I position an oil supply tank 91 (Fig. 3) upon the upstanding portion 58 of the carriage which has oil lines 92 and 93 leading therefrom. Oil line 92, as shown in Figs. 5 and 8, is connected to a slotted block 94, whilst oil line 93 is directed upon the bearing surfaces of the carriage and knife subjacent the oscillating wrist plate 79.

The means for making the marginal edges for the cut formed by the reciprocating knife comprise a plow 95 and a vertical blade 96 mounted on the frame in transverse spaced relationship. The plow is adjustably mounted on the frame by means of a bar 96 movably positioned between frame member 17 and toggle plate 97. The upper portion of said bar is provided with a threaded block 98 which receives a threaded shaft 99 rotatably fixed to a member 100 positioned on the frame, said shaft having a hand wheel 101 positioned at its upper end (Fig. 3). This plow is employed to make the marginal cut for the outside or border strip of sod comprising the area to be cut by the machine and also serves, at all times, to level off any irregularities of the ground over which the portion of the knife directly behind it must move. In other words, the plow clears a path for that portion of the knife and knife carriage surrounding the point where the knife actuating mechanism is connected to the knife. After the border strip of sod has been cut, the side of my machine upon which the plow is positioned may always face the area already cut by my device, thus requiring the cutting of but a single marginal edge by means of the vertical blade 96.

The vertical blade is resiliently mounted on the frame by means of a pivot pin 102 and has a link 103 pivoted to the upper end of said blade and threaded at its upper end to receive a hand wheel 104. An extension 105 positioned on the frame rotatably receives the shaft intermediate its end. An expansion spring 106 encircles the shaft and engages the hand wheel and said extension. If, in operation, the lower end of the blade should come in contact with an obstruction, it would rotate counterclockwise against the bias of the expansion spring which thereby permits the blade to clear the obstruction without damaging its cutting edge.

I have described a means for producing an elongated strip of sod of any desired length which may be cut into smaller sections by means of a hand-operated tool or by a device shown in Figs. 10 and 11 which may be positioned upon the sod cutter. The device is positioned rearwardly of the reciprocating knife adjacent the operator's station 31 and consists of an elongated vertical knife 107 positioned transversely of the frame and given a small amount of lost motion longitudinally of the frame by means of a pivoted plate 108 positioned rearwardly of the knife and urged toward said knife at the lower portion by means of a spring 109. The upper edge of the vertical knife is provided with springs 110 which are fastened to arm 111 pivoted to the frame 112 and adapted to engage a cam 113 driven by roller 23. A spring 114a bears upon the arm and is adapted to keep the arm in engagement with the cam and also raises the knife 107 when the arm engages the reduced portion of the cam. The cam is driven from the roller by means of a sprocket 114 mounted coaxially with said cam on shaft 115, said sprocket meshing in an endless chain 116 which engages sprocket 117 pinned to roller 23. It is desirable to use the cutting device without actuating the knife 107 and, to this end, the sprocket 114 is transversely movable on shaft 115, being adapted to move freely on the outermost position of said shaft and engaging a keyed portion 118 of the shaft when moved inwardly to thereby drive said shaft. It will be seen that with the rotation of the roller 23, the vertical knife will be urged downwardly, thereby severing the strip of sod into sections of any desired length.

What is claimed is:

1. A machine for making a narrow elongated cut for producing sod in strips comprising a frame, a prime mover on the frame, means for supporting the frame, means including a connection with the prime mover for providing movement to the frame in the longitudinal direction of the cut, a horizontal knife mounted on the frame, and means for connecting the prime mover and the knife for reciprocating said knife transversely of the cut.

2. A sod cutter comprising a frame, means for providing directional movement to the frame, a roller mounted on the frame transversely of the direction of movement of the frame and adapted to press downwardly upon the sod, a horizontal knife mounted on the frame subjacent, and in substantial parallelism with, the roller, and means for reciprocating the knife transversely of the direction of movement of the frame.

3. A sod cutter comprising a frame, means for providing directional movement to the frame, a roller for supporting the frame and mounted thereon at right angles to the direction of movement of said frame, a horizontal knife mounted on the frame subjacent, and in substantial parallelism with, the roller, and means for reciprocating the knife transversely of the direction of movement of the frame.

4. A sod cutter comprising a frame, means for providing directional movement to the frame, a roller for supporting the frame and mounted thereon at right angles to the direction of movement of said frame, a horizontal knife mounted on the frame rearwardly of and subjacent the roller and positioned in substantial parallelism with said roller, and means for reciprocating the knife transversely of the direction of movement of the frame.

5. A sod cutter comprising a frame, means for providing directional movement to the frame, a roller for supporting the frame and mounted thereon at right angles to the direction of movement of said frame, a horizontal knife mounted on the frame rearwardly of and subjacent the roller and positioned in substantial parallelism with said roller, means for adjusting the vertical position of the knife, and means for reciprocating the knife transversely of the direction of movement of the frame.

6. A sod cutter comprising a frame, a front and a rear roller for supporting the frame and mounted thereon at right angles to the direction of movement of said frame, a motor on the frame, means for connecting the rear roller to the motor, means associated with the front roller for directing the movement of the frame, a knife mounted on the frame rearwardly of and subjacent the rear roller, and positioned in substantial parallelism with said roller, and a means connecting the knife to the motor for reciprocating said knife transversely of the direction of movement of the frame.

7. A sod cutter comprising a frame, a front and a rear roller for supporting the frame, means associated with the front roller for directing the movement of the frame, means for mounting the front roller on the frame to permit rotation of said roller in a plane at right angles to the direction of movement of said frame, a knife mounted on the frame rearwardly of and subjacent the rear roller and positioned substantially parallel to the said roller, a motor mounted on the frame for driving the rear roller, and means connecting the knife to the motor for reciprocating said knife transversely of the direction of movement of the frame.

8. A sod cutter comprising a frame, a front and a rear roller for supporting the frame, means for mounting the front roller on the frame to permit rotation of the front roller in a plane transversely of said frame, a knife mounted on the frame rearwardly of and subjacent the rear roller and positioned substantially parallel to the said roller, a motor mounted on the frame, means connecting the rear roller to the motor for selectively driving said roller at various relative speeds, means connecting the knife to the motor for reciprocating said knife transversely of the direction of movement of the frame at selective relative speeds and means associated with the front roller for controlling the direction of movement of the sod cutter.

9. A machine for making a narrow, elongated cut for producing sod in strips comprising a frame, a roller for supporting the frame, means for providing movement to the frame in the longitudinal direction of the cut, a plow and a vertical cutting knife mounted on the frame and spaced to make the longitudinal, marginal edges for the strip, a knife mounted on the frame rearwardly of and subjacent the roller and positioned transversely of the longitudinal dimension of the cut, and means for reciprocating the knife crosswise of said cut.

10. A machine for making a narrow elongated cut for producing sod in strips comprising a frame, a roller for supporting the frame, means for providing movement to the frame in the longitudinal direction of the cut, a knife normally mounted on the frame rearwardly of and subjacent the roller and positioned transversely of the longitudinal dimension of the cut, means for vertically adjusting the knife relative to the roller and means for reciprocating the knife cross-wise of said cut.

11. A sod cutter having a frame, a roller for supporting the frame, a source of power mounted on the frame, a reciprocating knife positioned rearwardly of the roller and transversely of the frame, a carriage for the knife mounted on the frame, means associated with the carriage for adjusting the vertical position of the knife relative to the roller, and means connected to the source of power and adapted to actuate the knife.

12. A sod cutter having a frame, a roller for supporting the frame, a source of power mounted on the frame, a knife positioned rearwardly of the roller and transversely of the frame, a carriage for the knife mounted on the frame, and means connected to the source of power and the knife for actuating the knife and comprising a crank-wheel driven from the source of power, a wrist-plate pivoted for oscillation in a horizontal plane, a pitman connecting the crank-wheel and the wrist plate, and an arm formed on the knife end engaging the wrist-plate for reciprocating the knife in a horizontal plane transversely of the frame.

13. A sod cutter having a frame, a roller for supporting the frame, a source of power mounted on the frame, a knife positioned rearwardly of the roller, a carriage for the knife mounted on the frame, means associated with the carriage for adjusting the vertical position of the knife relative to the roller, and means connected with the source of power and the knife for actuating the knife and comprising a crank-wheel driven from the source of power, a wrist-plate pivoted on the carriage for oscillation in a horizontal plane, a jointed pitman connected to the wrist-plate, an elongated slot formed in the free end of the pitman, a block movably held in the slot and rotatably fastened to the crank-wheel, a shear pin connection between the pitman and the block, and an arm formed on the knife and in engagement with the wrist-plate for reciprocating the knife in a horizontal plane transversely of the frame.

14. A sod cutter having a frame, a roller for supporting the frame, a source of power mounted on the frame, a knife carriage positioned rearwardly of the roller and transversely of the frame and comprising a U-shaped member having a horizontal portion and upstanding side members, a groove formed in the horizontal portion of the carriage member, a knife positioned beneath the horizontal portion, a guide member for the knife movably positioned in the groove, lock plates positioned above the horizontal portion and fastened to the guide member, means associated with the carriage for adjusting the vertical position of the knife relative to the roller, and means connected with the source of power for reciprocating the knife transversely of the frame.

15. A sod cutter having a frame, a roller for supporting the frame, a source of power mounted on the frame, a reciprocating knife positioned rearwardly of the roller and transversely of the frame, a carriage for the knife comprising a U-shaped member having a horizontal portion and upstanding side members, vertical guides mounted on the frame, blocks movable in the guides having central interiorly threaded apertures, synchronized threaded shafts rotatable in the apertures for concurrently adjusting the vertical position of the blocks in the guides, means for fastening the upper ends of the upstanding portions to said blocks, and means connected with the source of power and adapted to reciprocate the knife transversely of the frame.

16. A sod cutter having a frame, a roller for supporting the frame, a source of power mounted on the frame, a knife positioned rearwardly of the roller, a carriage for the knife mounted on the frame and comprising a U-shaped member having a horizontal portion and upstanding side members, a groove formed in the horizontal portion of the carriage, a knife positioned beneath the horizontal portion, a guide member for the knife movably positioned in the groove, a lock plate positioned above the horizontal portion and fastened to the guide member, means associated with the carriage for adjusting the vertical position of the knife relative to the roller, and means connected with the source of power and the knife for actuating the knife and comprising a crank-wheel driven from the source of power, a wrist-plate pivoted on the carriage for oscillation in a horizontal plane, a jointed pitman connected to the wrist-plate, an elongated slot formed in the free end of the pitman, a block movably held in the slot and rotatably fastened to the crank-wheel, a shear pin connection between the pitman and the block, and an arm formed on the knife and in engagement with the wrist-plate for reciprocating the knife in a horizontal plane transversely of the frame.

17. A machine for making a narrow elongated cut to produce sod in strips comprising a frame, means for supporting the frame, means for providing movement to the frame in the longitudinal direction of the cut, a knife mounted on the frame and reciprocated transversely of the cut, a source of power for actuating the knife and moving the frame and means for making the marginal edges of the cut and comprising a plow and a vertical blade mounted on the frame in transverse spaced relationship, means for adjusting the vertical position of the plow and means for resiliently positioning the blade.

18. A sod cutter comprising a frame, means for moving the frame, a reciprocating knife mounted transversely of the frame for making an elongated horizontal cut, and means for producing a transverse vertical cut and comprising a cam driven by the means for moving the frame, a vertical knife resiliently mounted transversely of the frame, an arm mounted on the frame and engaging the cam and the knife.

19. A sod cutter comprising a frame, front and rear suspension members, means associated with the front suspension member for directing the movement of the frame, a knife mounted on the frame rearwardly of and subjacent the rear suspension means, a motor mounted on the frame, a means connecting the knife to the motor for reciprocating said knife transversely of the direction of movement of the frame and means connected to the motor for propelling said frame.

20. In a sod cutting machine the combination of a frame, means on the frame for moving the machine, a reciprocating knife mounted on the frame and adapted to operate at a predetermined distance beneath grass-covered top soil, and means for supporting the frame positioned forwardly of and superjacent the knife and adapted to progressively compact and hold down an area of said top soil as it is cut by said knife.

21. In a sod cutting machine the combination of a frame, a source of power mounted on the frame, means on the frame for directing the movement of said frame, a reciprocating knife mounted transversely on the frame and adapted to operate at a predetermined distance beneath grass-covered top soil, means for connecting the source of power and the knife, means upon the top soil for supporting the frame, said means being positioned forwardly of and superjacent the knife and adapted to progressively compact and hold down a transverse area of said top soil as it is being cut by said knife, and means for connecting the last mentioned means with the source of power.

22. In a sod cutting machine the combination of a frame, a source of power mounted on the frame, a reciprocating knife mounted transversely on the frame and adapted to operate at a predetermined distance beneath top soil, rotatable means for supporting the frame positioned forwardly of and superjacent the knife and adapted to progressively compact and hold down a transverse area of said top soil as it is cut by said knife, and means for connecting the source of power with the rotatable means for moving the machine.

JOSEPH H. KROEGER.